(12) United States Patent
Kim

(10) Patent No.: US 6,686,869 B2
(45) Date of Patent: Feb. 3, 2004

(54) METHOD AND SYSTEM FOR DETERMINING DRIVING ENVIRONMENT

(75) Inventor: Jee-Young Kim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/318,604

(22) Filed: Dec. 12, 2002

(65) Prior Publication Data

US 2003/0112174 A1 Jun. 19, 2003

(30) Foreign Application Priority Data

Dec. 18, 2001 (KR) ........................................ 2001-80546

(51) Int. Cl.⁷ ............................................... G01S 13/93
(52) U.S. Cl. ............................. 342/70; 342/71; 342/72; 342/107; 342/115
(58) Field of Search ............................. 342/70, 71, 72, 342/107, 113, 115

(56) References Cited

U.S. PATENT DOCUMENTS

| | | | | |
|---|---|---|---|---|
| 4,073,359 A | * | 2/1978 | Fujiki et al. ................ 180/169 |
| 4,383,238 A | * | 5/1983 | Endo .......................... 340/901 |
| 4,706,195 A | * | 11/1987 | Yoshino et al. ............... 701/96 |
| 4,833,469 A | * | 5/1989 | David ......................... 340/901 |
| 5,247,296 A | * | 9/1993 | Spies ......................... 340/901 |
| 5,249,157 A | * | 9/1993 | Taylor ........................ 340/903 |
| 5,475,494 A | * | 12/1995 | Nishida et al. ............ 356/4.01 |
| 5,530,651 A | * | 6/1996 | Uemura et al. ............. 701/301 |
| 6,498,972 B1 | * | 12/2002 | Rao et al. ..................... 701/45 |

FOREIGN PATENT DOCUMENTS

| | | |
|---|---|---|
| JP | 09-288340 | 10/1997 |
| KR | 075218 | 12/1996 |

* cited by examiner

Primary Examiner—John B. Sotomayor
(74) Attorney, Agent, or Firm—Pennie & Edmonds LLP

(57) ABSTRACT

When a reflective wave reflected from a preceding object is received, the reflective wave being of an original radar beam scanned at a variable vertical angle, the vertical angle is detected, an absolute speed of the preceding object is calculated based on a vehicle speed and a relative speed calculated from the reflective wave, and accordingly a driving environment is determined based on the vertical angle and the absolute speed.

14 Claims, 3 Drawing Sheets

METHOD AND SYSTEM FOR DETERMINING DRIVING ENVIRONMENT

FIELD OF THE INVENTION

The present invention relates to a method and system for determining a vehicle driving environment, and more particularly, to a method and system for determining a vehicle driving environment that adapts to an undulating road.

BACKGROUND OF THE INVENTION

Current systems for detecting approaching objects, such as a vehicle or a signpost, generally project a radar beam and analyze the reflected wave. To cover more area, such radar beams are scanned horizontally. Generally, where the scanning angle is varied, it is varied in a horizontal direction.

But the road a vehicle follows is rarely flat. In situations where the road has undulations, as shown in FIG. 1, a vehicle 10 often cannot detect an approaching object 11 using current systems. And when the vehicle 10 is driven in a mountainous district, not detecting an approaching object 11 becomes more problematic.

SUMMARY OF THE INVENTION

An exemplary driving environment determining method for a vehicle according to a preferred embodiment of the present invention includes: scanning a radar beam from the vehicle at a variable vertical angle; detecting a reflective wave of the radar beam reflected from an object; detecting the vertical angle of the radar beam when the reflective wave is detected; calculating a relative speed of the preceding object based on the reflective wave; detecting a vehicle speed of the vehicle; calculating an absolute speed of the object based on the relative speed and the vehicle speed; comparing the vertical angle with a predetermined angle; and comparing the absolute speed with a predetermined speed.

The absolute speed of the preceding object may preferably be calculated as a sum of the relative speed and the vehicle speed, and the predetermined angle and the predetermined speed are preferably preset to zero (0).

In the case that the vertical angle is above the predetermined angle and the absolute speed is different from the predetermined speed, the method concludes that either an incline is in front of the vehicle or that the object is large.

In the case that the vertical angle is greater than the predetermined angle and the absolute speed is equal to the predetermined speed, the method concludes that the object is stationary.

In the case that the vertical angle is less than the predetermined angle and the absolute speed is different from the predetermined speed, the method concludes that a decline is in front of the vehicle.

An exemplary driving environment determining system for a vehicle according to a preferred embodiment of the invention includes: a radar for scanning a radar beam and detecting a reflective wave reflected from an object; a mirror for adjusting a vertical angle of the scanned radar beam according to an angular position thereof; a mirror angle detector for detecting the angular position of the mirror; a stepper motor for adjusting the angular position of the mirror; and an electronic control unit, where the electronic control unit executes programmed steps for: calculating a relative speed of the object based on the reflective wave detected at the radar; calculating an absolute speed of the preceding vehicle based on the relative speed and a vehicle speed of the vehicle; detecting the vertical angle of the radar beam of the reflective wave; and comparing the vertical angle and the absolute speed with a predetermined angle and speed.

The electronic control unit calculates the absolute speed of the preceding vehicle as a sum of the relative speed and the vehicle speed and the predetermined angle and the predetermined speed are preferably preset to zero (0).

In the case that the vertical angle is greater than the predetermined angle and the absolute speed is different from the predetermined speed, the ECU concludes that either an incline is in front of the vehicle or the preceding object is large.

In the case that the vertical angle is greater than the predetermined angle and the absolute speed is equal to the predetermined speed, the ECU concludes that the object is stationary.

In the case that the vertical angle is less than the predetermined angle and the absolute speed is different from the predetermined speed, the ECU concludes that a decline is in front of the vehicle.

BRIEF DESCRIPTION OF THE DRAWINGS

The following detailed description of the invention will be better understood with reference to the following drawings in which.

Like numerals refer to similar elements throughout the several drawings.

DETAILED DESCRIPTION OF THE PREFERRED EMBODIMENTS

Figure 1:
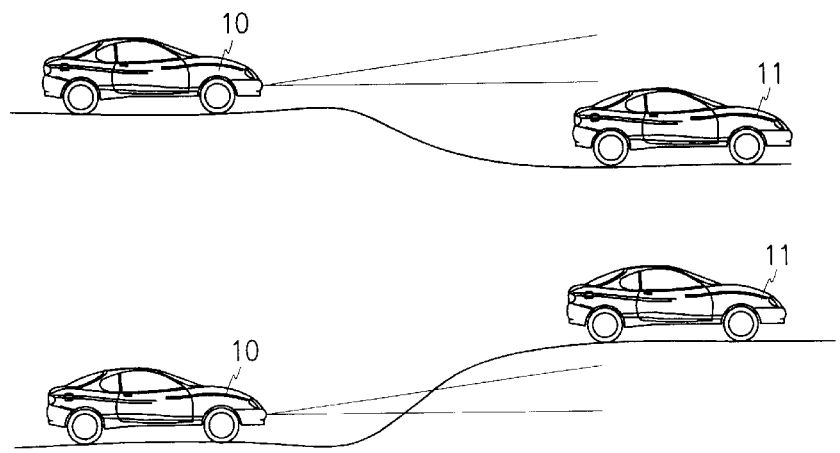
FIG. 1 illustrates situations where a vehicle fails to detect an approaching object.
Figure 2:
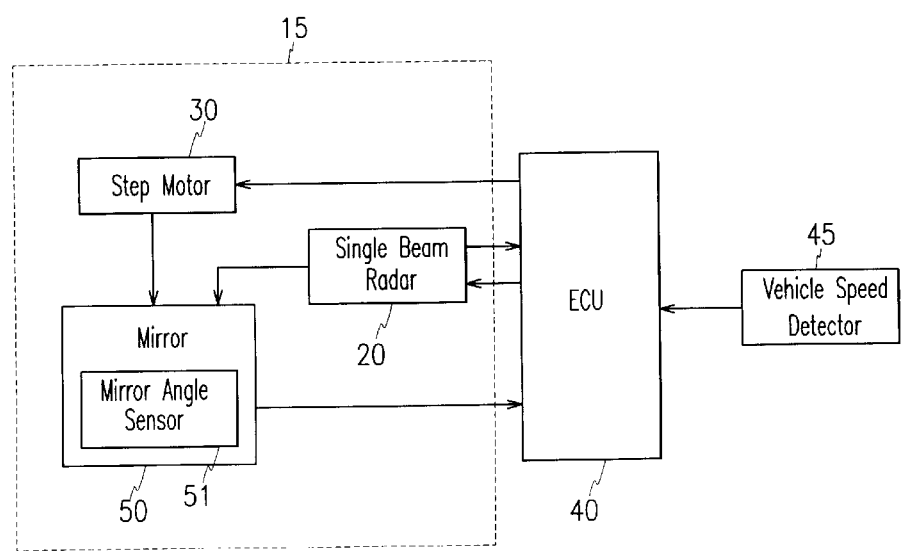
FIG. 2 is a block diagram of a driving environment determining system according to a preferred embodiment of the present invention.

Returning to FIG. 1, a driving environment determining system for a vehicle 10 according to a preferred embodiment of the present invention detects the approaching object 11. The system is not limited to detecting objects as they approach, but will also detect objects as they recede, although approaching objects are generally of greater interest to a driver. As shown in FIG. 2, a preferred embodiment of a system according to the invention includes: a single-beam radar 20 for scanning a radar beam and detecting a wave reflected from the object 11 (FIG. 1); a mirror 50 for adjusting a vertical angle (for example, an angle between the radar beam and the horizontal plane) of the scanned radar beam according to an angular position thereof; a mirror angle sensor 51 for sensing the angular position of the mirror 50; a stepper motor 30 for adjusting the angular position of the mirror 50; and an electronic control unit 40 ("ECU"); a vehicle speed sensor 45 for detecting the speed of vehicle 10 is connected to the ECU 40 so the ECU can receive a vehicle speed signal.

The ECU can be fabricated using one or more processors programmed with software employing a method according to a preferred embodiment of the present invention. Multiple processors could also be incorporated into separate communicating ECUs.

The software is programmed to perform the steps of: calculating the relative speed of the approaching object based on the reflected wave detected by the single beam radar; calculating an absolute speed of the approaching vehicle 11 based on its relative speed and the speed of the vehicle 10; detecting the vertical angle of the radar beam of the reflective wave; and comparing the vertical angle of the reflected wave and the absolute speed with a predetermined angle and speed.

Figure 3:
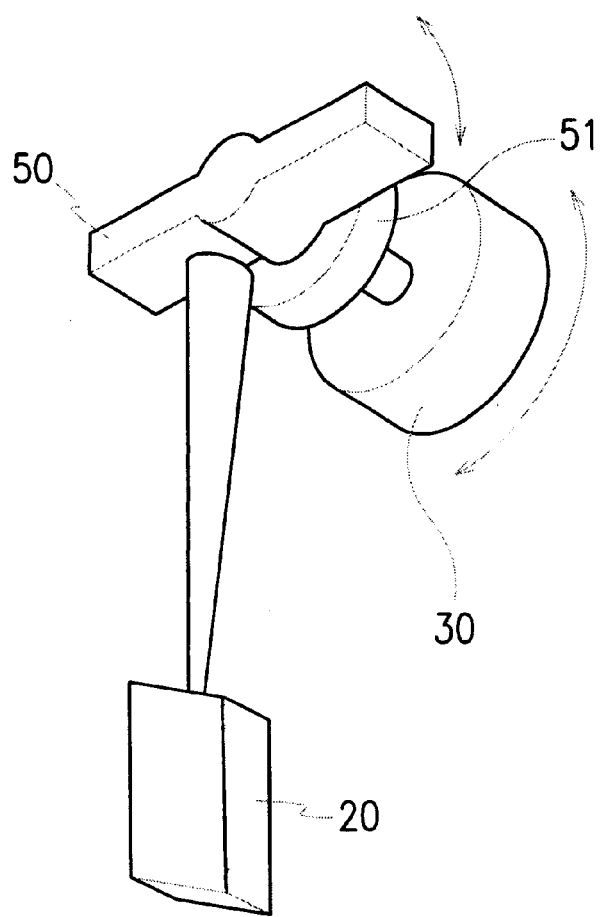
FIG. 3 illustrates a cooperative relationship between a single beam radar, a mirror, a mirror angle sensor, and a stepper motor according to a preferred embodiment of the present invention.

As shown in FIG. 3, the mirror angle sensor 51 is disposed at a shaft connecting the mirror 50 and the stepper motor 30, and detects the rotation angle of the shaft as the angular position of the mirror. The single-beam radar 20, the stepper motor 30, the mirror angle sensor 51, and the mirror 50 may be assembled as a module. The module is disposed on the vehicle 10 (FIG. 1), and more precisely, on a bumper 15 of the vehicle 10. The mirror 50 rotates according to the operation of the stepper motor 30. The angular position of the mirror 50 is detected and transmitted to the ECU 40. The ECU 40 adjusts the angular position of the mirror 50 by controlling the stepper motor 30. A radar beam projected from the single-beam radar 20 is reflected by the mirror 50 and radiated in the forward direction of the vehicle 10. The radar beam is reflected by the approaching object 11. The reflected wave of the radar beam is detected by the single-beam radar 20 and analyzed by the ECU 40. The ECU 40 determines the driving environment based on the reflected wave and the mirror angle, (i.e., the vertical angle of the radar beam radiated to the forward direction of the vehicle 10), and the speed of vehicle 10.

Figure 4:
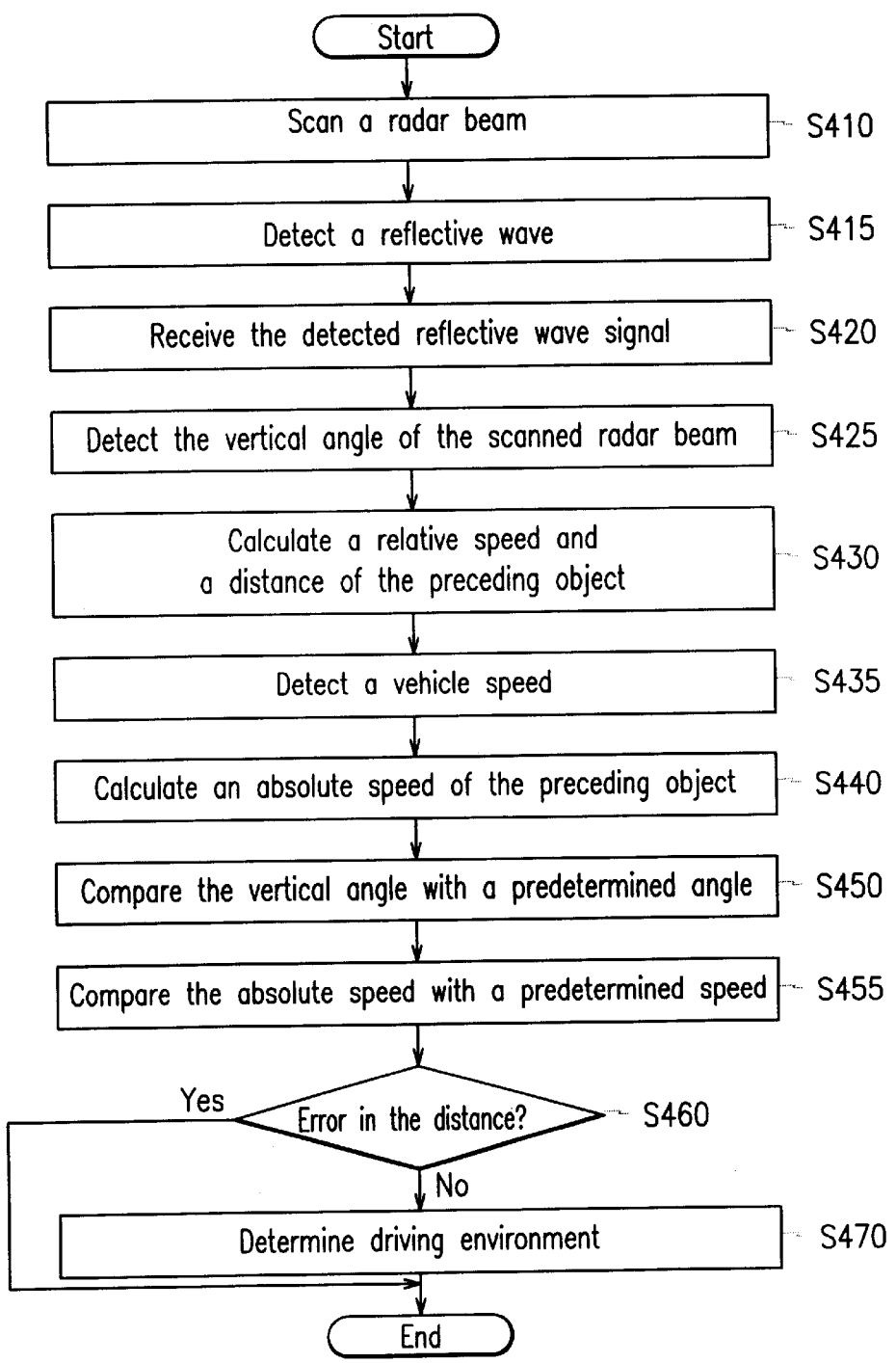
FIG. 4 is a flowchart of a driving environment determining method according to a preferred embodiment of the present invention.

The driving environment determining method according to a preferred embodiment of the present invention is now described in detail with reference to FIG. 4. At step S410, a radar beam is projected by the single-beam radar 20 is radiated from the vehicle 10 at a variable vertical angle and scanned horizontally. The radar beam is reflected by the approaching object 11 when the horizontal scan and vertical angles direct the radar beam to the approaching object 11. Preferably, the radar beam is scanned across an 11.5° arc (A) in 100 msec (T), but (A) may be increased to an 17.25° arc. Also preferably, the speed with which the vertical angle varies is calculated as A/(T/2). At step S415, the reflected wave is detected by the single-beam radar 20. At step S420 the ECU 40 receives the reflected radar beam signal from the single-beam radar 20. At step S425, the vertical angle of the radar beam is detected by the mirror angle sensor 51. The ECU 40 also receives the vertical angle of the radar beam at step S425. At step S430, the ECU 40 calculates the relative speed of the approaching object 11 and distance to the approaching object 11 based on the reflective wave signal. One of ordinary skill in the art will know how to make this calculation. At step S435, the ECU 40 calculates a vehicle speed of the vehicle 10 using the vehicle speed sensor 45. At step S440, the ECU 40 calculates an absolute speed of the approaching object 11 as a sum of the relative speed of object 11 and the speed of vehicle 10.

The vertical angle of the radar beam and the calculated absolute speeds are now used to determine whether an incline or decline is in front of the vehicle 10. To do this, at step S450 the ECU 40 compares the vertical angle with a predetermined angle and at step S455 compares the absolute speed with a predetermined speed. The predetermined angle is preferably set to 0 (the horizontal), and the predetermined speed is preferably set to 0.

According to results of the comparisons at step S450 and S455, the ECU 40 determines a driving environment at step S470, and performs any subsequent steps desired by a person of ordinary skill in the art. Subsequent steps may be related to warning signals, or sending the driving environment information to other ECUs. At step S460, the distance to the preceding object 10 is checked, and the determining the driving environment (step S470) is preferably performed only when the distance to the preceding object 10 is not in a predetermined error range.

The ECU 40 determines the driving environment at step S470 as follows. Where the vertical angle is greater than the predetermined angle (i.e., the radar beam is scanned above the horizontal direction from the vehicle 10) and the absolute speed is different from the predetermined speed, the ECU 40 concludes that either an incline is in front or the approaching object 11 is large, like a bus or a truck. Where the vertical angle is greater than the predetermined angle and the absolute speed is equal to the predetermined speed, the ECU 40 determines that the approaching object 11 is stationary, such as a signpost. Where the vertical angle is below the predetermined angle, i.e., the radar beam is scanned below the horizontal direction from the vehicle 10, and the absolute speed is different from the predetermined speed, the ECU 40 concludes that a decline is in front of the vehicle.

As shown above, according to a preferred embodiment of the present invention, the possibility of missing an object on an undulating road is reduced and an approaching incline or decline is easily detected based on the vertical angle.

While this invention has been described in connection with the preferred embodiments, it is to be understood that the invention is not limited to the disclosed embodiments and includes the various modifications and equivalent arrangements that are within the spirit and scope of the appended claims.

What is claimed is:

1. A method for determining vehicle driving environment, comprising:
   scanning a radar beam from the vehicle at a variable vertical angle;
   detecting a reflected wave from the radar beam being reflected from an object;
   detecting the vertical angle of the radar beam when the reflected wave is detected;
   calculating a relative speed of the object based on the reflected wave;
   detecting a vehicle speed of the vehicle;
   calculating an absolute speed of the object based on the relative speed and the vehicle speed;
   comparing the vertical angle with a predetermined angle; and
   comparing the absolute speed with a predetermined speed.

2. The method of claim 1, wherein:
   the absolute speed of the object is calculated as a sum of the relative speed and the vehicle speed; and
   the predetermined angle and the predetermined speed are respectively set to zero (0).

3. The method of claim 1 further comprising determining that an incline is in front of the vehicle or that the object is large, if the vertical angle is above the predetermined angle and the absolute speed is different from the predetermined speed.

4. The method of claim 1 further comprising determining that the object is stationary if the vertical angle is above the predetermined angle and the absolute speed is equal to the predetermined speed.

5. The method of claim 1 further comprising determining that a decline is in front of the vehicle if the vertical angle is below the predetermined angle and the absolute speed is different from the predetermined speed.

6. A vehicle driving environment determining system for detecting an object, the system comprising:
- a radar for scanning a radar beam and detecting a reflected wave reflected from an object;
- a mirror for adjusting a vertical angle of the scanned radar beam according to an angular position thereof;
- a mirror angle detector for detecting the angular position of the mirror;
- a stepper motor for adjusting the angular position of the mirror; and
- an electronic control unit (ECU) programmed for: calculating a relative speed of the object based on the reflected wave detected by the radar; calculating an absolute speed of the object based on the relative speed and a vehicle speed of the vehicle; detecting the vertical angle of the radar beam; and comparing the vertical angle and the absolute speed with a predetermined angle and speed, respectively.

7. The system of claim 6, wherein:
- the electronic control unit calculates the absolute speed of the vehicle as the sum of the relative speed and the vehicle speed; and
- the predetermined angle and the predetermined speed are preset to 0.

8. The system of claim 6 wherein:
- the radar, the stepper motor, the mirror angle detector, and the mirror are assembled as a module; and
- the module is disposed at a bumper of the vehicle.

9. The system of claim 6, further comprising a vehicle speed detector.

10. A method for determining road grade from a vehicle, the method comprising:
- projecting a radar from a vehicle toward an object, the object reflecting a radar wave back to the vehicle;
- receiving the radar wave;
- determining a first angle corresponding to the direction the radar was projected that resulted in the reflected radar wave;
- calculating a relative speed of and a relative distance to the object based on the received radar wave;
- determining a vehicle speed;
- calculating an absolute speed of the object based on the vehicle speed and the relative speed;
- comparing the absolute speed to zero speed;
- comparing the first angle to a predetermined angle; and
- determining a road grade, comprising:
  - concluding that either the road grade is positive, or that the object is large, if the first angle is above the predetermined angle and if the absolute speed is not zero speed;
  - concluding that the object is stationary if the first angle is above the predetermined angle and the absolute speed is zero speed; and
  - concluding that the road grade is negative if the first angle is below the predetermined angle and the absolute speed is not zero speed.

11. The method of claim 10, wherein the predetermined angle changes based on the relative distance.

12. The method of claim 10, wherein the projecting comprises scanning the radar horizontally and varying a vertical angle the radar is projected.

13. The method of claim 10, wherein the determining a road grade is only performed when the relative distance is in a predetermined range.

14. A system for determining road grade from a vehicle, the system comprising:
- a radar for projecting from a vehicle and receiving reflected radar waves;
- a rotatable mirror for varying an angle the radar is projected from the vehicle;
- a mirror angle sensor for determining the angle;
- a motor for rotating the mirror;
- a vehicle speed sensor; and
- at least one electronic control unit, said at least one electronic control unit being programmed with software for:
  - determining a first angle corresponding to the direction the radar was projected that resulted in the reflected radar wave;
  - calculating a relative speed of and a relative distance to the object based on the received radar wave;
  - determining a vehicle speed using the vehicle speed sensor;
  - calculating an absolute speed of the object based on the vehicle speed and the relative speed;
  - comparing the absolute speed to zero speed;
  - comparing the first angle to a predetermined angle; and
  - determining a road grade, comprising:
    - concluding that either the road grade is positive, or that the object is large, if the first angle is above the predetermined angle and if the absolute speed is not zero speed;
    - concluding that the object is stationary if the first angle is above the predetermined angle and the absolute speed is zero speed; and
    - concluding that the road grade is negative if the first angle is below the predetermined angle and the absolute speed is not zero speed.

* * * * *